Dec. 4, 1934. A. J. MOORE 1,983,388
DEVICE FOR TESTING AND SORTING OF ELECTRICALLY CONDUCTING PARTS
Filed Sept. 30, 1932
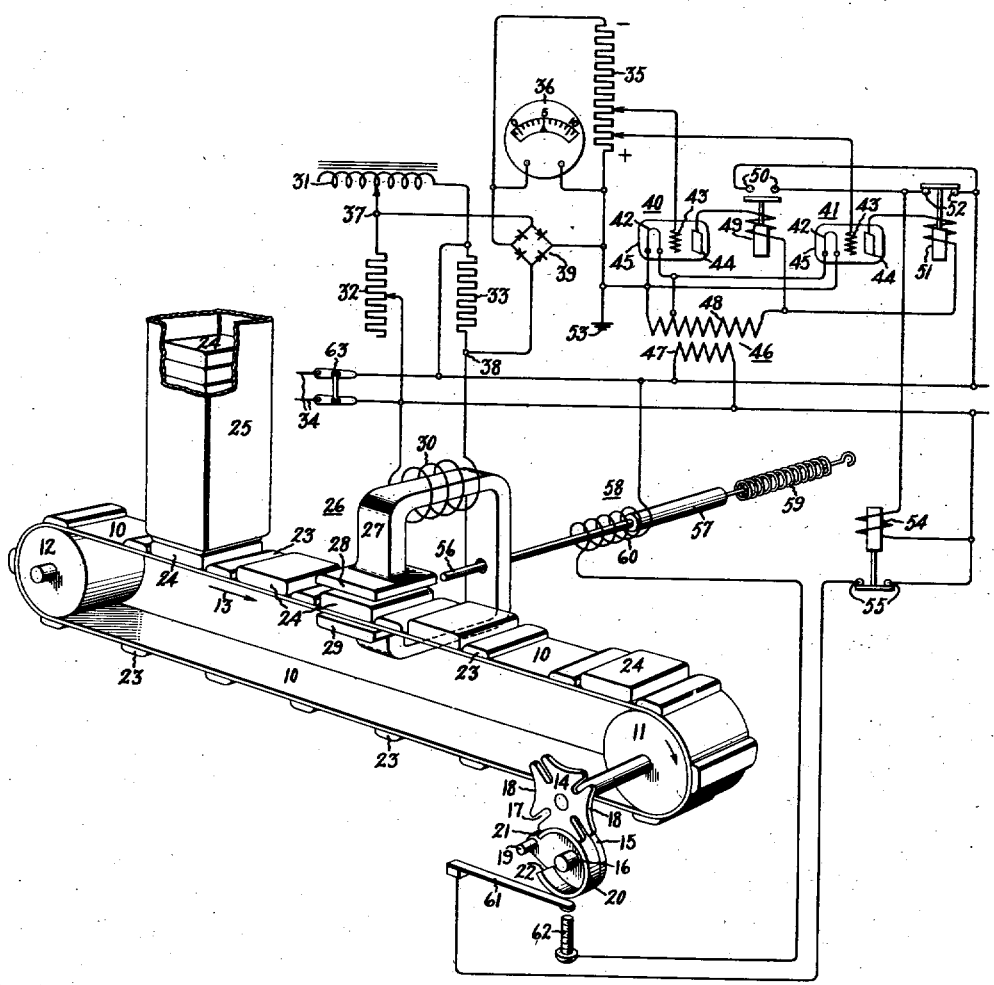
Inventor:
Abram J. Moore,
by Chas. E. Muller
His Attorney.

Patented Dec. 4, 1934

1,983,388

UNITED STATES PATENT OFFICE 1,983,388

DEVICE FOR TESTING AND SORTING OF ELECTRICALLY CONDUCTING PARTS

Abram J. Moore, Melrose Highlands, Mass., assignor to General Electric Company, a corporation of New York Application September 30, 1932, Serial No. 635,583

8 Claims. (Cl. 209—81)

My invention relates to a testing and rejecting device for electrically conducting parts. The principal object of my invention is to provide a device that will test an electrically conducting part and automatically reject it when its chemical composition and/or its physical characteristic is appreciably different from that of a standard electrically conducting part. A more specific object of my invention is to provide a device that will consecutively test a plurality of packages carried by a moving conveyor, each package containing one or more metallic parts, and that will automatically reject each package containing the wrong number of parts. A further object of my invention is to provide a device that will test an electrically conducting part and that will indicate its chemical composition and/or its physical characteristic as compared with that of a standard electrically conducting part, and/or that will test a package containing one or more electrically conducting parts and that will indicate the number of such parts in the package.

Modern industry manufactures large quantities of small and medium size metallic parts. Some of these parts are used in the factory where they are made for building various articles, some parts are manufactured for sale in units, and other parts are put up in packages at the factory, each package containing a number of parts and sold to the public in the original package. An example of the latter is packages of safety razor blades. The demand for high quantity production and low manufacturing cost led to the use of conveyer systems for transporting these parts in the factory from one operation to the next until they reach the assembly room, if they are used in building some article in the factory, or until they reach the shipping room, if they are sold in units or several parts in a package. Precision requirements of present day manufacturing practice demand that the chemical composition and/or the physical characteristic of each part of a given kind reaching the assembly room or shipping room should not be appreciably different from that of a standard part. In the case of packages containing one or more metallic parts it is obviously desirable that each package reaching the shipping room should contain the correct number of parts. The combination of the above described requirements led to a demand in industry for the devices which it is the object of my invention to provide.

My invention, briefly described, consists of arranging the driving means for the conveyor so that the latter is periodically advanced a predetermined amount with the conveyor remaining in a stationary position for a predetermined period after each advance, and providing an electrical circuit including an electromagnet adapted to receive a metallic part or a package carried by the conveyor as a portion of its magnetic circuit, this electrical circuit being energized by alternating current and being adapted to have between two points thereof a potential difference whose magnitude is responsive to the impedance of the electromagnet. This electrical circuit is preferably a Wheatstone bridge circuit, and the electromagnet connected in one of its arms is preferably made to have as a portion of its magnetic circuit an air gap adapted to receive a metallic part or a package carried by the conveyor. The electromagnet is so positioned that the metallic parts, or the packages carried by the conveyor consecutively occupy a portion of its air gap during successive stationary positions of the conveyor. The difference of potential across the Wheatstone bridge, caused by an unbalance thereof, controls the operation of electroresponsive means which in turn control the energization of a solenoid having a movable plunger adjacent to the air gap of the electromagnet for ejecting the metallic part or the package from the conveyer. The Wheatstone bridge is so adjusted that the solenoid is energized and the metallic part or package ejected from the conveyer only when the particular characteristic under investigation of the metallic part in the air gap is appreciably different from that of the standard metallic part, or only when the package in the air gap contains the wrong number of metallic parts.

My invention, however, will best be understood from the following description when considered in connection with the accompanying drawing, while those features of my invention which are believed to be novel and patentable are pointed out in the appended claims.

The single figure of the drawing shows a view, partly in perspective and partly in elevation, of a preferred embodiment of my invention. In order to simplify the description of my invention, I will first give a detailed description thereof in connection with its use for testing and rejecting packages of safety razor blades, but I wish it strictly understood that my invention is not limited thereto.

In this figure, 10 represents an endless conveyor on the peripheries of two rotatably mounted pulleys 11 and 12. Pulley 11 is the driving pulley for conveyor 10, whereas pulley 12 is the driven pulley. Any suitable intermittent motion driving means may be employed for periodically advancing conveyor 10 a predetermined amount with its top side moving in the direction shown by arrow 13 and with the conveyor remaining in a stationary position for a predetermined perod after each advance. For the sake of illustration, I have shown this intermittent motion driving means as the well known Geneva gear drive. This Geneva gear drive is shown as consisting of a wheel 14 secured to pulley 11 and a driver 15 secured to a shaft 16 which is continually rotated in a counter-clockwise direction by any suitable driving means (not shown). Wheel 14 has four radial slots 17 which separate four teeth 18 whose outer edges are circular in shape. Driver 15 has a driving pin 19 and a circularly shaped projection 20 whose outer circumference has the same curvature as the outer surfaces of teeth 18. Projection 20 on driver 15 does not form a closed loop, but it has its two ends 21 and 22 separated a distance equal to or very slightly greater than the distance between the centers of two adjacent teeth 18. Driver 15 is so mounted that the outer surface of projection 20 just slides on the outer surface of the bottom tooth 18, and pin 19 on the driver is so positioned that when end 22 of projection 20 just passes the center of the bottom tooth 18 in the direction of rotation the pin just enters the lower right-hand slot 17. Assume that driver 15 is in the position shown and is rotating in a counter-clockwise direction. The tendency of the sliding contact between projection 20 and the bottom tooth 18 is to rotate wheel 14 clockwise, but so long as projection 20 remains in contact with any portion of the bottom tooth 18 between its center and right-hand end the wheel is locked and cannot move because this portion of the bottom tooth cannot get past projection 20. However, as soon as end 22 of projection 20 passes the center of the bottom tooth 18 in the direction of rotation, the wheel is capable of rotation clockwise and is so rotated because at that instant pin 19 enters the lower right-hand slot 17 and moves the wheel clockwise one-quarter of a revolution, the portion of wheel 14 between the centers of its bottom and right-hand teeth 18 fitting into the gap between ends 21 and 22 of projection 20 and slot 17 being sufficiently deep so that pin 19 does not strike its bottom during this movement of wheel 14. The right-hand tooth 18 will now be the bottom tooth, the projection 20 will slide on the outer surface of this tooth, and wheel 14 will remain stationary until end 22 of the projection again passes the center of this tooth, whereupon the wheel will again be rotated one-quarter of a revolution. This operation is repeated with each tooth 18, hence it should be obvious that conveyer 10 is periodically advanced a predetermined amount with its top side moving in the direction shown by arrow 13 and the conveyer remaining in a stationary position for a predetermined period after each advance.

Secured to the outer side of conveyor 10 by any suitable means (not shown) are a plurality of spacers 23 separated a distance which is very slightly greater than the width of a package of safety razor blades, represented by 24. Packages 24 may be placed on the top side of conveyer 10 between strips 23 by any suitable means. For the sake of illustration, the following means are shown. A hollow rectangular receptacle 25, having an open bottom, is filled with a large quantity of packages 24, and is so positioned above the top side of conveyor 10 that the distance from the bottom edge of the receptacle to the bottom of a strip 23 is slightly greater than the thickness of a package 24. The thickness of strips 23 is such that the distance from the top of a strip to the bottom edge of receptacle 25 is slightly less than the thickness of a package 24. When a strip 23 is under the bottom opening of receptacle 25, the bottom package in the receptacle is partly inside and partly outside of the receptacle and, therefore, cannot be deposited on conveyor 10; but when the adjacent edges of two successive strips 23 are substantially in line with the extremities of the bottom opening of the receptacle the bottom package is free to move completely out of the receptacle and be deposited on the conveyer between these two strips, hence it should be obvious that as the conveyer is periodically advanced, one package at a time will be deposited between consecutive strips 23. Receptacle 25 is preferably so positioned that a package is deposited on the conveyer during the period the latter is stationary.

An electromagnet 26 is adapted to receive the packages on the conveyor as a part of its magnetic circuit. This electromagnet consists of a magnetic core 27 having two oppositely disposed similar flanged ends 28 and 29 of slightly greater length and width than a package 24, these ends being separated a distance slightly greater than the combined thickness of the top side of conveyor 10 and a package 24, the core 27 being surrounded by a coil 30. Core 27 is so positioned that conveyor 10 with packages 24 thereon consecutively passes through the air gap between its ends 28 and 29 as the conveyor is periodically advanced, and every time the conveyor is stationary one of the packages on the conveyor is substantially central between ends 28 and 29 so as to form a part of the magnetic circuit of the core. Coil 30 forms one arm of a Wheatstone bridge circuit, the other three arms consisting of a variable inductance 31, a variable resistance 32, and a fixed resistance 33, the bridge circuit being connected to an alternating current source represented by 34. The difference of potential across the Wheatstone bridge circuit, caused by an unbalance thereof, is impressed on a resistance 35 and a direct current milli-voltmeter 36, both of which are connected across points 37 and 38 of the bridge circuit, a suitable full wave rectifier 39 being interposed so as to convert the alternating current into direct current, the polarities being as shown adjacent to resistance 35.

Each of two electric discharge tubes 40 and 41 consists of a cathode filament 42, a grid 43, and an anode 44, all enclosed within a highly evacuated container 45, these tubes being a well known form of electron discharge tube. A transformer 46 has a primary winding 47 connected to source 34 and a secondary winding 48 having a few of its left-hand end turns connected across filaments 42 for heating them. The anode 44 of tube 40 is connected in series with the winding of a relay 49 to the right-hand terminal of secondary winding 48, this relay having a pair of normally open contacts 50. The anode 44 of tube 41 is connected in series with the winding of a relay 51 to the right-hand end terminal of secondary winding 48, this relay having a pair of normally closed contacts 52. One terminal of each filament 42 is connected to the positive terminal of resistance 35, and is also connected to the ground, as shown at 53, to drain any static charges existing on the filaments. The grids 43 are connected to predetermined points on resistance 35 as later explained. A relay 54 has a pair of contacts 55, and its winding is so connected in series with contacts 50 or 52 to source 34 that it is energized when either pair of contacts 50 and 52 is closed. The movable element of relay 54 is biased in a direction to open its contacts 55, but these contacts are shown closed in the drawing because contacts 52 of relay 51 are shown closed, the reason for this being obvious from the operating description hereinafter given. A rod 56 protrudes through a hole in core 27 and is so positioned that when it is moved towards conveyor 10 it ejects therefrom the package 24 in its path of movement between the oppositely disposed ends of the core. Rod 56 is secured to one end of a movable core 57 of a solenoid 58, the other end of this core being secured to a helical spring 59, which is secured to some stationary part. A coil 60 is so positioned around a portion of core 57 that the energization of this coil draws this core in far enough so that rod 56 ejects the package from the conveyor. Coil 60 is connected to source 34 in series with a flexible metallic strip 61, a stationary contact stud 62, and contacts 55 of relay 54. Strip 61 is secured to some stationary part and is so arranged that normally it does not touch contact 62, but once during every revolution of driver 15 the pin 19 engages the strip and keeps it pressed against contact 62 for a predetermined period. A switch 63 is provided for disconnecting the apparatus from the alternating current source when it is not used.

A description of the operation of the above apparatus follows. Assume that each package 24 is supposed to contain five razor blades and it is desired to eject from the conveyor every package containing more or less than five blades. The Wheatstone bridge circuit and the connections from grids 43 to resistance 35 are so adjusted that when conveyor 10 is stationary and a package containing five blades is placed between ends 28 and 29 of core 27, the grid bias voltage of tube 41 is such that sufficient current flows through the winding of relay 51 to effect its operation so that the latter opens its contacts 52, whereas the grid bias voltage of tube 40 is such that insufficient current flows through the winding of relay 49 to effect its operation so that its contacts 50 remain open. The Wheatstone bridge and the connections from grids 43 to resistance 35 are also so adjusted that when a package containing less than five blades, as for example four, is placed between ends 28 and 29, the decreased inductance of electromagnet 26 due to the smaller number of blades in the package sufficiently decreases the unbalanced bridge voltage to lower the grid bias voltage on tube 40 far enough to permit sufficient current to flow through the winding of relay 49 to effect its operation so that the latter closes its contacts 50, whereas the decreased grid bias voltage on tube 41 permits even more current to flow through the winding of relay 51 than flowed therethrough with five blades in the package; hence, relay 51 will operate and open its contacts 52. The Wheatstone bridge and the connections from grids 43 to resistance 35 are also so adjusted that when a package containing more than five blades, as for example six, is placed between ends 28 and 29, the increased inductance of electromagnet 26 due to the greater number of blades in the package sufficiently increases the unbalanced bridge voltage to increase the grid bias voltage on tube 41 far enough so that insufficient current flows through the winding of relay 51 to effect its operation so that its contacts 52 remain closed, whereas the increased grid bias voltage on tube 40 permits even less current to flow through the winding of relay 49 than flowed therethrough with five blades in the package; hence, relay 49 does not operate and its contacts 50 remain open.

Now, assume that conveyer 10 has been advanced so that a package 24 deposited on the conveyer is now between ends 28 and 29 of core 27, and assume that this package is in that position only since pin 19 left the lower left-hand slot 17 of wheel 14. If this package contains five blades it will be obvious from the previous explanation that contacts 50 of relay 49 will remain open and that contacts 52 of relay 51 will be opened; hence, relay 54 will have its contacts 55 open and when driver 15 moves around so that pin 19 presses strip 61 against contact 62 the circuit of coil 60 will remain open because contacts 55 will be open, and, therefore, the package will not be ejected from the conveyer. If, however, the above package contains less than five blades, the contacts 52 of relay 51 will be opened, but the contacts 50 of relay 49 will be closed, hence relay 54 will close its contacts 55 and when driver 15 moves around so that pin 19 presses strip 61 against contact 62 the circuit of coil 60 will be completed and the package will be ejected from the conveyer. The pin 19 holds strip 61 against contact 62 sufficiently long so that the energization of coil 60 is for a period long enough to permit rod 56 to travel far enough to eject the package from the conveyer. When driver 15 moves far enough so that pin 19 no longer presses strip 61 against contact 62, the circuit for coil 60 is opened and spring 59 pulls rod 56 back to its normally stationary position as shown, this occurring before pin 19 has moved sufficiently far to enter the lower right-hand slot 17 so that rod 56 will be clear from the conveyer before the latter is again advanced. If, however, the above package contains more than five blades, the contacts 50 of relay 49 will remain open and the contacts 52 of relay 51 will remain closed, hence relay 54 will close its contacts 55 and when driver 15 moves around so that pin 19 presses strip 61 against contact 62 the circuit of coil 60 will be completed and the package will be ejected from the conveyer. This operation of the apparatus will be true with every package between ends 28 and 29 of core 27, hence it should be obvious that the above described apparatus will successively test the packages on the conveyer and reject each package containing the wrong number of blades.

It will be understood, of course, that a suitable receptacle is provided for receiving the packages containing the right number of blades when they leave the right-hand end of the conveyer, and a suitable receptacle is provided for receiving the packages containing the wrong number of blades when they are rejected from the conveyer. I have not shown such receptacles, because their arrangement is immaterial to my invention and because their omission from the drawing simplifies the latter.

Now, assume that instead of testing and sorting packages for the number of magnetic parts contained therein it is desired to test and sort magnetic parts in accordance with their permeabilities. For example, assume that 24 represents magnetic parts and it is desirable to test these parts for their permeabilities and to reject automatically any part whose permeability differs more than a predetermined amount from that of a standard magnetic part. This can readily be accomplished by so adjusting the Wheatstone bridge circuit and the connections from grids 43 to resistance 35 that when a part 24 having the same permeability as that of the standard part, or having a permeability which differs not more than a predetermined amount from that of the standard part, is brought between ends 28 and 29 of core 27, the relay 49 will not operate and relay 51 will operate; but if a part 24 having a permeability which is lower by more than this predetermined amount from that of the standard part is brought between ends 28 and 29, the decreased inductance of electromagnet 26 due to the lower permeability of the part being tested will be sufficient to effect the operation of relay 49, whereas if a part 24 having a permeability which is higher by more than this predetermined amount from that of the standard part is brought between ends 28 and 29, the increased inductance of electromagnet 26 due to the higher permeability of the part being tested will be sufficient to prevent operation of either of relays 49 and 51. It is obvious that these adjustments are similar to the previously described adjustments made with the packages containing 5, 4, and 6 blades, respectively; hence, it should be clear that the apparatus will successively test magnetic parts 24 for their permeabilities and will automatically reject from the conveyer any part whose permeability differs more than a predetermined amount in either direction from that of a selected standard part.

Now, assume that it is desired to test and sort magnetic or non-magnetic metallic parts or other electrically conducting parts, as, for example, carbon, in accordance with their chemical compositions, or in accordance with their mechanical dimensions. For example, first assume that 24 represents electrically conducting parts that have the same mechanical dimensions but whose chemical compositions may vary and it is desired to test these parts for their chemical compositions and to reject automatically any part whose chemical composition differs more than a predetermined amount from that of a standard part. It is clear that since the mechanical dimensions of the parts are the same, the electrical resistance of each part will depend on its chemical composition. Next, assume that 24 represents electrically conducting parts that have the same chemical compositions but whose mechanical dimensions may vary, and it is desired to test these parts for their mechanical dimensions and to reject automatically any part whose mechanical dimensions differ more than a predetermined amount from that of a standard part. It is clear that since the chemical compositions of the parts are the same, the electrical resistance of each part will depend on its mechanical dimensions. It should also be clear that when a part 24 is inserted between ends 28 and 29 of core 27 the part serves as the short circuited secondary of a transformer whose primary winding is coil 30 and whose magnetic core is core 27. The impedance of the primary winding of a transformer increases when the impedance of its secondary winding is increased, and vice-versa; hence, the electrical resistance of the part 24 which is between ends 28 and 29 of core 27 not only determines its own impedance, but also determines the impedance of coil 30, and, therefore, determines the difference of potential across the Wheatstone bridge, due to an unbalance thereof. From the explanation previously given it should be obvious that if 24 represents electrically conducting parts that have the same mechanical dimensions but whose chemical compositions vary, the Wheatstone bridge and the connections from grids 43 to resistance 35 can be so adjusted that the apparatus will successively test these parts for their chemical compositions and will automatically reject from the conveyor any part whose chemical composition differs more than a predetermined amount in either direction from that of a selected standard part. It should also be obvious that if 24 represents electrically conducting parts that have the same chemical compositions but whose mechanical dimensions vary, the Wheatstone bridge and the connections from grids 43 to resistance 35 can be so adjusted that the apparatus will successively test these parts for their mechanical dimensions and will automatically reject from the conveyor any part whose mechanical dimensions differ more than a predetermined amount in either direction from that of a selected standard part.

From the previous explanations it should be obvious that if 24 represents packages each of which contains a number of electrically conducting parts, metallic or non-metallic, magnetic or non-magnetic, the parts in the package being tested act as short-circuited secondaries of a transformer and thus determine the unbalanced voltage of the Wheatstone bridge; hence, it will readily be possible to adjust the apparatus so that each package containing the wrong number of parts will automatically be rejected from conveyor 10. It should also be obvious that all of the previously described automatic testing and rejecting features can also be obtained when 24 represents a plurality of electrically conducting parts, metallic or non-metallic, magnetic or non-magnetic, grouped into one mass and not confined within a package.

Now, assume that it is desired to perform any of the previously described testing and sorting operations on electrically conducting parts 24 without the automatic feeding feature. In that case, conveyor 10, pulleys 11 and 12, receptacle 25, and the Geneva gear drive may be eliminated. Each part 24 will then be placed manually by an operator on the face of end 29 of core 27, after which the operator will press strip 61 against contact 62. It is obvious that a part 24 will or will not be rejected under the same conditions and for the same reasons as when conveyor 10 was employed, and, therefore, if a part 24 is automatically rejected from its position the operator will know that this part should be put in a receptacle for rejected parts, whereas if a part 24 is not automatically rejected from its position the operator will manually remove it and know that it should be put in a receptacle for satisfactory parts.

Now, further assume that it is also desired to dispense with the automatic rejecting feature and only determine the number of electrically conducting parts that are grouped into one mass, whether or not they are confined within a package, or only determine the variation in magnetic permeability, or chemical composition, or mechanical dimensions of each part 24 from that of a standard electrically conducting part. In those cases, resistance 35, tubes 40 and 41, relays 49, 51 and 54, transformer 46, and solenoid 58 may also be eliminated. If, for example, 24 represents packages of blades, the scale of milli-voltmeter 36 will be graduated and will, for example, also have 0, 5, 10, etc., marked thereon, and the Wheatstone bridge circuit will be so adjusted that when the operator places a package on the face of end 29 of core 27 the milli-voltmeter 36 will indicate the number of blades in the package. The same results obviously can be obtained when packages 24 contain non-magnetic metallic parts instead of magnetic parts, or contain non-metallic electrically conducting parts, and also when 24 represents a plurality of electrically conducting parts, metallic or non-metallic, magnetic or non-magnetic, grouped into one mass and not confined within a package.

Suppose, however, that 24 represents electrically conducting parts and it is desired to have milli-voltmeter 36 indicate the difference in the magnetic permeability, or chemical composition, or mechanical dimensions of each part 24 from that of a standard part. In that case assume, for example, that 5 on the scale of milli-voltmeter 36 is to represent the particular characteristic under investigation of the standard part. The Wheatstone bridge circuit will then be so adjusted that when the standard part is placed on the face of end 29 of core 27 the milli-voltmeter 36 will indicate 5. Parts 24 may now be tested by placing them one at a time on the face of end 29 of core 27 and pressing strip 61 against contact 62. If milli-voltmeter 36 indicates 5 it shows that the part being tested has the same characteristic as the standard part; if it indicates below 5 it shows that the characteristic of the part being tested differs in one direction from that of the standard part; and if it indicates above 5 it shows that the characteristic of the part being tested differs in the opposite direction from that of the standard part. Of course, the scale of milli-voltmeter 36 can have on its face any other series of numbers or figures correlated to the particular characteristic under investigation of the parts being tested.

Since my apparatus is capable of performing the operations described herein on a metallic or non-metallic electrically conducting part and/or on a plurality of metallic or non-metallic electrically conducting parts grouped into one mass, I wish it understood that wherever I employ in the claims the term "metallic part" or "electrically conducting part", I mean not only a single part, but I also mean a plurality of parts grouped into one mass, whether or not they are confined within a package; and I also wish it understood that wherever I employ in the claims the term "particular characteristic under investigation", I not only mean the testing of an electrically conducting part for its chemical composition, or for its magnetic permeability, or for its mechanical dimensions, but I also mean the testing of a plurality of such parts grouped into one mass for its quantity, whether or not the parts are confined within a package.

In concluding, I wish to point out three of the outstanding advantages of my invention. These are:

(1) Very high sensitivity. By suitably proportioning the arms of the Wheatstone bridge circuit it is readily possible to detect a very slight difference between the chemical composition or the physical characteristic of an electrically conducting part and that of a standard part, and/or to detect the smallest difference between the number of electrically conducting parts grouped in a mass and the number of parts the mass should contain.

(2) Reliability and uniformity of operation. By employing a Wheatstone bridge circuit the operation of the apparatus is substantially independent of frequency variations and the ordinary voltage variations of the A. C. source 34.

(3) Simplicity of testing apparatus. The Wheatstone bridge circuit may be connected directly to any A. C. source of suitable voltage and frequency without employing any regulating device therefor.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. A testing and rejecting device for parts comprising an alternating current energized impedance element adapted to produce flux lines and having as a part of its flux circuit an air gap adapted to receive the part to be tested, a movable arm adjacent said air gap for ejecting therefrom the part being tested, a solenoid for actuating said arm, a relay having a pair of normally closed contacts, a relay having a pair of normally open contacts, means including said pairs of contacts for effecting the energization of said solenoid when either of said pairs of contacts are closed, and means responsive to the current flowing in said impedance element for effecting the energization of the first mentioned relay when the particular characteristic under investigation of the part in said air gap is substantially the same as that of a standard part, and for effecting the energization of the second mentioned relay when the particular characteristic under investigation of the part in said air gap is appreciably different from that of said standard part.

2. A testing and rejecting device for electrically conducting parts, comprising an alternating current energized Wheatstone bridge circuit having an electromagnet connected in one of its arms, said electromagnet having as a portion of its magnetic circuit an air gap adapted to receive the electrically conducting part to be tested, a movable arm adjacent to said air gap for ejecting the electrically conducting part therefrom, a solenoid for actuating said arm, a relay having a pair of normally closed contacts, a relay having a pair of normally open contacts, means including said pairs of contacts for effecting the energization of said solenoid when either of said pairs of contacts are closed, and means responsive to the difference of potential across said bridge circuit, caused by an unbalance thereof, for effecting the energization of the first mentioned relay when the particular characteristic under investigation of the electrically conducting part in said air gap is substantially the same as that of a standard part, and for effecting the energization of the second mentioned relay when the particular characteristic under investigation of the electrically conducting part in said air gap is appreciably different from that of said standard part.

3. A testing and rejecting device for electrically conducting parts comprising an alternating current energized Wheatstone bridge circuit having an electromagnet connected in one of its arms, said electromagnet having as a portion of its magnetic circuit an air gap adapted to receive the electrically conducting part to be tested, means positioned adjacent to said air gap for removing the electrically conducting part therefrom, two electron discharge devices, each having an anode, a cathode, and a grid, connecting means between said bridge circuit and said discharge devices for impressing across the cathode and grid of each discharge device a voltage whose magnitude is responsive to the difference of potential across the bridge circuit, caused by an unbalance thereof, means responsive to the current flowing between the anode and cathode of one of said discharge devices for effecting the operation of said removing means when the particular characteristic under investigation of the electrically conducting part in said air gap is appreciably different in one direction from that of a standard part, and means responsive to the current flowing between the anode and cathode of the other of said discharge devices for effecting the operation of said removing means when the particular characteristic under investigation of the electrically conducting part in said air gap is appreciably different in the opposite direction from that of said standard part.

4. A testing and rejecting device for electrically conducting parts, comprising an alternating current energized Wheatstone bridge circuit having an electromagnet connected in one of its arms, said electromagnet having as a portion of its magnetic circuit an air gap adapted to receive the electrically conducting part to be tested, a solenoid having a movable core adjacent to said air gap for ejecting the electrically conducting part therefrom, two electron discharge devices, each having an anode, a cathode and a grid, connecting means between said bridge circuit and said discharge devices for impressing across the cathode and grid of each discharge device a voltage whose magnitude is responsive to the difference of potential across the bridge, caused by an unbalance thereof, a relay having a pair of normally closed contacts and a winding connected in series with the anode of one of said discharge devices, a relay having a pair of normally open contacts and a winding connected in series with the anode of the other of said discharge devices, and means including the contacts of said relays for effecting the energization of said solenoid when either pair of contacts are closed.

5. A testing and rejecting device for electrically conducting parts, comprising an alternating current energized Wheatstone bridge circuit having an electromagnet connected in one of its arms, said electromagnet having as a portion of its magnetic circuit an air gap adapted to receive the electrically conducting part to be tested, a solenoid having a movable core adjacent to said air gap for ejecting the electrically conducting part therefrom, a resistance, connecting means between said bridge circuit and said resistance for impressing on the latter a voltage whose magnitude is responsive to the difference of potential across the bridge, caused by an unbalance thereof, two electron discharge devices, each having an anode, a cathode and a grid, means for connecting the cathode and grid of each discharge device across predetermined portions of said resistance, a relay having a pair of normally closed contacts and a winding connected in series with the anode of one of said discharge devices, a relay having a pair of normally open contacts and a winding connected in series with the anode of the other of said discharge devices, and means including the contacts of said relays for effecting the energization of said solenoid when either pair of contacts is closed.

6. In a conveying system having a movable conveyor carrying a plurality of consecutively disposed electrically conducting parts, the combination of driving means for periodically advancing the conveyer a predetermined amount in a given direction with the conveyer remaining in a stationary position for a predetermined period after each advance, and a testing and rejecting device for said electrically conducting parts, said device comprising an alternating current energized Wheatstone bridge circuit having an electromagnet connected in one of its arms, said electromagnet having as a portion of its magnetic circuit an air gap adapted to receive an electrically conducting part carried by said conveyer and being so positioned that the electrically conducting parts carried by said conveyer consecutively occupy a portion of its air gap during successive stationary positions of the conveyer, electromagnetically operated means positioned adjacent to said air gap for removing the electrically conducting part therefrom, means including two pairs of contacts for effecting the energization of said electro-magnetically operated means when both pairs of contacts are closed, means responsive to the difference of potential across said bridge circuit, caused by an unbalance thereof, for effecting the closing of one of said two pairs of contacts when the particular characteristic under investigation of the electrically conducting part in said air gap is appreciably different from that of a standard part, and means responsive to the operation of said driving means for effecting the closing of the other of said two pairs of contacts when said conveyer is in a stationary position.

7. In a conveying system having a movable conveyer carrying a plurality of consecutively disposed electrically conducting parts, the combination of driving means for periodically advancing the conveyer a predetermined amount in a given direction with the conveyer remaining in a stationary position for a predetermined period after each advance, and a testing and rejecting device for said electrically conducting parts, said device comprising an alternating current energized Wheatstone bridge circuit having an electromagnet connected in one of its arms, said electromagnet having as a portion of its magnetic circuit an air gap adapted to receive an electrically conducting part carried by said conveyer and being so positioned that the electrically conducting parts carried by said conveyer consecutively occupy a portion of its air gap during successive stationary positions of the conveyer, electromagnetically operated means positioned adjacent to said air gap for removing the electrically conducting part therefrom, means including two pairs of contacts for effecting the energization of said electromagnetically operated means when both pairs of contacts are closed, an electron discharge device having an anode, a cathode and a grid, connecting means between said bridge circuit and said discharge device for impressing across its cathode and grid a voltage whose magnitude is responsive to the difference of potential across the bridge circuit, caused by an unbalance thereof, means responsive to the current flowing between the anode and cathode of said discharge device for effecting the closing of one of said two pairs of contacts when the particular characteristic under investigation of the electrically conducting part in the air gap is appreciably different from that of a standard part, and means responsive to the operation of said driving means for effecting the closing of the other of said two pairs of contacts when said conveyer is in a stationary position.

8. In a conveying system having a movable conveyer carrying a plurality of packages, each containing at least one metallic part, the combination of means for periodically advancing the conveyer a predetermined amount in a given direction with the conveyer remaining in a stationary position for a predetermined period after each advance, and a device for consecutively testing said packages and automatically rejecting each package containing a number of metallic parts which is different from a predetermined amount, said device comprising an alternating current energized Wheatstone bridge circuit having an electromagnet connected in one of its arms, said electromagnet having a magnetic core with an air gap through which said conveyer passes and which is so positioned that the packages carried by the conveyer consecutively occupy a portion of its air gap during successive stationary positions of the conveyer, a solenoid having a movable plunger adjacent to said air gap for ejecting the package therefrom, means including two pairs of contacts for effecting the energization of said solenoid when both pairs of contacts are closed, a resistance, connecting means between said bridge circuit and said resistance for impressing on the latter a voltage whose magnitude is responsive to the difference of potential across the bridge, caused by an unbalance thereof, two electron discharge devices, each having an anode, a cathode and a grid, means for connecting the cathode and grid of each discharge device across predetermined portions of said resistance, a relay having a pair of normally closed contacts and a winding connected in series with the anode of one of said discharge devices, a relay having a pair of normally open contacts and a winding connected in series with the anode of the other of said discharge devices, means including the contacts of said relays for effecting the closing of one of the first mentioned two pairs of contacts when either of said relays has its pair of contacts closed, and means responsive to the operation of said driving means for effecting the closing of the other of the first mentioned two pairs of contacts when said conveyer is in a stationary position.

ABRAM J. MOORE.

CERTIFICATE OF CORRECTION.

Patent No. 1,983,388.  December 4, 1934.

ABRAM J. MOORE.

It is hereby certified that error appears in the printed specification of the above numbered patent requiring correction as follows: Page 6, line 100, claim 6, after the word "energized" strike out the period; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.

closed, an electron discharge device having an anode, a cathode and a grid, connecting means between said bridge circuit and said discharge device for impressing across its cathode and grid a voltage whose magnitude is responsive to the difference of potential across the bridge circuit, caused by an unbalance thereof, means responsive to the current flowing between the anode and cathode of said discharge device for effecting the closing of one of said two pairs of contacts when the particular characteristic under investigation of the electrically conducting part in the air gap is appreciably different from that of a standard part, and means responsive to the operation of said driving means for effecting the closing of the other of said two pairs of contacts when said conveyer is in a stationary position.

8. In a conveying system having a movable conveyer carrying a plurality of packages, each containing at least one metallic part, the combination of means for periodically advancing the conveyer a predetermined amount in a given direction with the conveyer remaining in a stationary position for a predetermined period after each advance, and a device for consecutively testing said packages and automatically rejecting each package containing a number of metallic parts which is different from a predetermined amount, said device comprising an alternating current energized Wheatstone bridge circuit having an electromagnet connected in one of its arms, said electromagnet having a magnetic core with an air gap through which said conveyer passes and which is so positioned that the packages carried by the conveyer consecutively occupy a portion of its air gap during successive stationary positions of the conveyer, a solenoid having a movable plunger adjacent to said air gap for ejecting the package therefrom, means including two pairs of contacts for effecting the energization of said solenoid when both pairs of contacts are closed, a resistance, connecting means between said bridge circuit and said resistance for impressing on the latter a voltage whose magnitude is responsive to the difference of potential across the bridge, caused by an unbalance thereof, two electron discharge devices, each having an anode, a cathode and a grid, means for connecting the cathode and grid of each discharge device across predetermined portions of said resistance, a relay having a pair of normally closed contacts and a winding connected in series with the anode of one of said discharge devices, a relay having a pair of normally open contacts and a winding connected in series with the anode of the other of said discharge devices, means including the contacts of said relays for effecting the closing of one of the first mentioned two pairs of contacts when either of said relays has its pair of contacts closed, and means responsive to the operation of said driving means for effecting the closing of the other of the first mentioned two pairs of contacts when said conveyer is in a stationary position.

ABRAM J. MOORE.

CERTIFICATE OF CORRECTION.

Patent No. 1,983,388.    December 4, 1934.

ABRAM J. MOORE.

It is hereby certified that error appears in the printed specification of the above numbered patent requiring correction as follows: Page 6, line 100, claim 6, after the word "energized" strike out the period; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.